UNITED STATES PATENT OFFICE.

CHARLES HIPPOLYTE BERTELS, OF BRUSSELS, BELGIUM, ASSIGNOR TO STANDARD SUGAR PROCESS COMPANY, LIMITED, OF LONDON, ENGLAND.

PROCESS FOR THE PURIFICATION OF SUGAR-JUICES.

No. 901,147.

Specification of Letters Patent.

Patented Oct. 13, 1908.

Application filed October 4, 1905. Serial No. 281,327.

*To all whom it may concern:*

Be it known that I, CHARLES HIPPOLYTE BERTELS, industriel, a subject of the King of the Belgians, and resident of 62 Boulevard du Nord, Brussels, Belgium, have invented a certain new and useful Process for the Purification of Sugar-Juices by Means of Hydrofluosilicic Acid, of which the following is a specification.

Numerous attempts have been made to purify sugar juices by means of various hydrofluosilicic acid compounds; as, for example, fluosilicates of calcium, barium, ammonium, lead, iron, and zinc. All these attempts have however proved impracticable, partly owing to the employment of unsuitable temperature conditions or improper strength of acid, partly to the resulting difficulties in filtering, or to the formation of invert sugar, or the neutralization of the solution before filtration, *i. e.*, while the fluosilicate is still present, but more particularly on account of the high costs which are associated with the use of this acid.

The invention under consideration consists in an improved process, by means of which, not only is the filtration made easy and the formation of invert sugar avoided, but the hydrofluosilicic acid is applied in such a way that it can be recovered for further use, while valuable products (sulfates) are produced, so that great advantages are obtained as compared with any of the known methods of using hydrofluosilicic acid or any other substance for the purification of sugar juices.

From a purely chemical standpoint, the various phases of the process are not yet thoroughly understood, but only by special attention to the following points can a successful result be obtained: 1. The whole of the operations must be carried out. 2. The decantation must be made at exactly the right moment. 3. Special temperature and acidity conditions as well as exact strengths of acid must be carefully attended to.

The process is carried out in the following manner. The sugar juice, in the form of syrups or molasses, is diluted to 22° Beaumé, with ordinary cold water. This density gives the best precipitate. The liquid is cooled in a water-jacketed vessel by means of cold water to a temperature of 8° C. A temperature of from 8° to 9° C. is the most suitable for a normal precipitation. If the temperature is higher, the hydrofluosilicic acid fails to act; if lower, the liquid becomes too thick and the precipitate does not form so easily. The jacketed vessel must be provided with a stirrer and distributing apparatus, which must be easily removable. While the liquid is in the vessel, a sample is taken and analyzed, to determine the ash content. For every gram of ash content 0.514 gram of hydrofluosilicic acid should be added. Further, it is desirable to add about one tenth more acid than the analysis requires because there are often other constituents present in the syrup which take up a certain quantity of the acid, and without the excess-quantity mentioned above, some of the potash in the juices might be left unprecipitated. The acid is added in a 30% solution which is in practice a solution of about 32° Beaumé. As the acid is poured in it must be equally distributed through the liquid by means of the apparatus above referred to. At the same time, the stirrer is set in motion and run for about five minutes. The stirring and distributing apparatus is then removed from the vessel by some suitable arrangement. The liquid being now at rest, the salts are precipitated. As soon as the precipitate has completely settled and the liquid is clear, the latter is decanted either by means of siphons or a row of taps arranged one above the other, the upper one being, of course, opened first. Great care must be taken that none of the precipitate, which contains the alkali fluosilicate, runs over. Finally the sludge is run off through a tap in the bottom of the vessel.

After rinsing once with water the vessel is ready for treating a further quantity of juice. The precipitate is caught in a specially arranged vessel and allowed to stand a long time so that the whole of the liquid may be run off after the solid matter has completely settled. The now salt-free liquor is run into a carbonating apparatus to be neutralized with milk of lime, at a density of 20° Baumé in order to remove the excess of hydrofluosilicic acid. After the addition of milk of lime, the liquid is then warmed to 60° C., and at this temperature it is neutralized, or rather is brought to a slightly alkaline condition as it is practically impossible to exactly neutralize the liquid. The alkalinity per liter will be equivalent to about one tenth of a cubic centimeter of standard lime solution, the "liter" of which is 10 c. cs.=0.05 of CaO (lime), in other words, about .0005 of CaO per liter. The liquid is then heated to 95° or 98° C. and allowed to stand. When the precipitation is complete it is filtered. From the filter the liquid passes to the vacuum apparatus to be condensed and further treated by the ordinary methods employed in sugar factories and refineries.

Particular care must be taken not to neutralize the liquid while alkali fluosilicate (potassium fluosilicate) is present, for in this case, if lime or baryta were also present, it would be impossible to recover the hydrofluosilicic acid. As this is an expensive item, the value of the process would be greatly decreased if the acid could only be used once. Instead of neutralizing with milk of lime, baryta water of 10° Baumé, may be used, so long as it lends itself to the formation of the products now about to be considered. No excess, however, must be added. Should an excess exist, it may be removed by means of ammonium sulfate.

The process above described can also be employed in the manufacture of sugar by ordinary methods. In this case, the raw (green) juice, either from beet or from the cane, is made up to 22° Baumé and is run into large cooling vessels for further treatment. It is preferable, however, to apply the processes above described to the syrup obtained after the first defecation (heating and carbonating), for if the green juice (i.e. the raw juice before defecation) is treated, the cost of the installation will be higher, and with no better result. The green juices may also be made more dense, before treatment, by the addition to them of syrup from the first treatment by the acid followed by the carbonating and filtering process, this syrup being already freed from potash. The process allows of the recovery of the hydrofluosilicic acid in a simple way, and therein is its great practical value. In treating the sugar juice, the acid forms an alkaline fluosilicate. In order to recover the acid, it is only necessary to add an equivalent amount of sulfuric acid, and for every 140 parts by weight of sulfuric acid 35 parts by weight of silica, and then to apply heat as in the usual process for the manufacture of hydrofluosilicic acid. By this means the fluorin is separated from the alkali and hydrofluosilicic acid is again formed. The alkalies are transformed into sulfates and in this way furnish a rich valuable manure. If in the recovery process, the addition of silica be omitted, then hydrofluoric acid is formed, which may be used for etching glass and has a high market value.

Having thus described my invention, what I claim as new and desire to secure by Letters Patent is:

1. The herein described process for purifying sugar juices, which consists in diluting such juices, adding hydrofluosilicic acid to the diluted juices for precipitating the alkaline salts therefrom, separating the liquor from said precipitate, adding milk of lime to the liquor, heating said liquor and milk of lime, and filtering off the clear solution.

2. The herein described process for purifying sugar juices, which consists in diluting such juices, adding hydrofluosilicic acid to the diluted juices at a temperature approximately 9° C. for precipitating the alkaline salts therefrom, separating the liquor from said precipitate, adding milk of lime to the liquor, heating said liquor and milk of lime initially to approximately 60° C. and subsequently increasing the temperature to approximately 95° C. to 98° C., and filtering off the clear solution.

3. The herein described process for purifying sugar juices, which consists in diluting such juices to a density of substantially 22° Baumé, adding an excess of hydrofluosilicic acid to the diluted juices at a temperature not above 9° C. for precipitating the alkaline salts therefrom, decanting the liquor from said precipitate, adding milk of lime to the liquor, heating said liquor and milk of lime initially to approximately 60° C. and subsequently increasing the temperature to approximately 95° C. to 98° C., and filtering off the clear solution.

In witness whereof I have hereunto set my hand in the presence of two witnesses.

CHARLES HIPPOLYTE BERTELS.

Witnesses:
  JACQUES GENER,
  GREGORY PHELAN.